United States Patent
Kawazoe et al.

(10) Patent No.: US 6,542,800 B2
(45) Date of Patent: Apr. 1, 2003

(54) LANE FOLLOWING VEHICLE CONTROL

(75) Inventors: Hiroshi Kawazoe, Kanagwa (JP); On Sadano, Kanagawa (JP); Masayasu Shimakage, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/876,134

(22) Filed: Jun. 8, 2001

(65) Prior Publication Data

US 2002/0013647 A1 Jan. 31, 2002

(30) Foreign Application Priority Data

Jul. 6, 2000 (JP) .......................................... 2000-205488

(51) Int. Cl.[7] .............................................. B62D 6/00
(52) U.S. Cl. ............................. 701/41; 701/28; 348/119
(58) Field of Search ...................... 701/41, 28; 348/118, 348/119; 180/168, 443; 342/71

(56) References Cited

U.S. PATENT DOCUMENTS 5,485,378 A * 1/1996 Franke et al. ............... 348/118
6,050,359 A * 4/2000 Mouri et al. ................ 180/168
6,212,453 B1 * 4/2001 Kawagoe et al. ........... 180/443
6,338,015 B1 * 1/2002 Kawagoe et al. ........... 180/167

FOREIGN PATENT DOCUMENTS

JP    7-104850    4/1995
JP    11-102499   4/1999

OTHER PUBLICATIONS

S.N. 09/875,157 Sadano et al., filed Jun. 7, 2001.

* cited by examiner

Primary Examiner—Michael J. Zanelli
(74) Attorney, Agent, or Firm—Foley & Lardner

(57) ABSTRACT

In accordance with a vehicle running condition along a lane and an actual steering angle, a control unit determine a target steering angle to follow the lane, and controls an actual steering torque with an actuator to a target steering torque to achieve the target steering angle. The control unit limits the target steering torque by setting a target torque limit determined in dependence on whether the control steering direction is a steer direction away from a straight ahead neutral position or a return direction toward the straight ahead neutral position, to take account of a self aligning torque.

14 Claims, 13 Drawing Sheets

LANE FOLLOWING VEHICLE CONTROL

BACKGROUND OF THE INVENTION

The present invention relates to lane following vehicle control technique for controlling a vehicle along a lane of a road.

A Published Japanese Patent Application Kokai Publication No. 7(1995)-104850 discloses a driver assist system for controlling a steering torque for lane following.

SUMMARY OF THE INVENTION

In this driver assist system, the steering torque during the lane following control is limited to a relatively low upper limit to allow a driver to readily perform intervening steering operation.

An actuator torque $T_{AC}$ produced by a steering actuator including an electric motor is expressed as:

$$T_{ACMAX} = T_{STMAX} - F_{OA} - T_{LO} - T_{SA} \quad (1)$$

where $T_{ACMAX}$ is a maximum torque produced by the actuator, $T_{LO}$ is a torque loss in the actuator, $F_{AO}$ is an overall friction force in the steering system, $T_{SA}$ is a self aligning torque, and $T_{STMAX}$ is a maximum steering torque during lane following control. While maximum steering torque $T_{SAMAX}$ is a fixed value which can be determined experimentally, and steering system's overall friction $F_{AO}$ is also a fixed value calculated by accumulating variations of parts, self aligning torque $T_{SA}$ is a variable varying in accordance with a vehicle running condition.

In the straight ahead running state of the vehicle, self aligning torque $T_{SA}$ is equal to zero, so that it is possible to limit the actuator maximum torque $T_{ACMAX}$ accurately to a level enabling driver's steering intervention. During cornering operation or lane changing operation in which nonzero self aligning torque $T_{SA}$ is produced, however, it is difficult or practically impossible to limit the actuator maximum torque $T_{ACMAX}$ accurately to the level for allowing driver's steering intervention because actuator maximum torque $T_{ACMAX}$ is varied by self aligning torque $T_{SA}$.

Moreover, in a steering system provided with a vehicle speed responsive type power steering system separately from an actuator for lane following control, a steering assist torque produced by the power steering system decreases with increase in the vehicle speed, and hence the self aligning torque $T_{SA}$ is influenced by the characteristic of the steering assist torque in the power steering system. Therefore, it is difficult or practically impossible to limit the actuator maximum torque $T_{ACMAX}$ accurately to the level for allowing driver's steering intervention because actuator maximum torque $T_{ACMAX}$ is varied by self aligning torque $T_{SA}$.

It is therefore an object of the present invention to provide lane following vehicle control apparatus and/or method allowing a driver to intervene adequately irrespective of changes in self aligning torque and improving lane following control performance.

According to the present invention, a lane following vehicle control apparatus for a vehicle, comprises: (1) a lane sensing section to collect information on a lane of a road ahead of the vehicle; (2) a steering angle sensing section to sense an actual steering angle of the vehicle; (3) a steering torque producing section to produce an actual steering torque in accordance with a target steering torque to follow the lane; (4) a steering torque controlling section to set the target steering torque required for the controlled vehicle to follow the lane, in accordance with the information on the lane and the actual steering angle; (5) a control steering direction discriminating section to determine whether a control steering direction of the steering torque controlling section is a steer direction away from a straight ahead neutral position or a return direction toward the straight ahead neutral position; and (6) a target steering torque limiting section to limit the target steering torque by setting a target torque limit in dependence on whether the control steering direction is the steer direction or the return direction.

According to the present invention, a lane following vehicle control process comprises: (1) collecting input information on a vehicle running condition of a vehicle running along a lane, and an actual steering angle of the vehicle; (2) producing a control signal to produce an actual steering torque in accordance with a target steering torque to follow the lane; (3) setting the target steering torque to achieve a target steering angle determined in accordance with the vehicle running condition and the actual steering angle to follow the lane; (4) determining whether a control steering direction of the target steering angle is a steer direction away from a straight ahead neutral position or a return direction toward the straight ahead neutral position; and (5) limiting the target steering torque by setting a target torque limit in dependence on whether the control steering direction is the steer direction or the return direction.

According to another aspect of the present invention, a lane following vehicle control apparatus comprises: (1) first means for collecting input information on a vehicle running condition of a vehicle running along a lane; (2) second means for sensing an actual steering angle of the vehicle; (3) third means for producing an actual steering torque in accordance with a target steering torque to follow the lane; (4) fourth means for determining a target steering angle in accordance with the vehicle running condition and the actual steering angle to follow the lane; (5) fifth means for setting the target steering torque to achieve the target steering angle to follow the lane; (6) sixth means for determining a control steering direction by monitoring changes in the target steering angle is; and (7) seventh means for limiting the target steering torque by setting a target torque limit in dependence on whether the control steering direction is a steer direction away from a straight ahead neutral position or a return direction toward the straight ahead neutral position.

The other objects and features of this invention will become understood from the following description with reference to the accompanying drawings.

DETAILED DESCRIPTION OF THE INVENTION

Figure 1A:
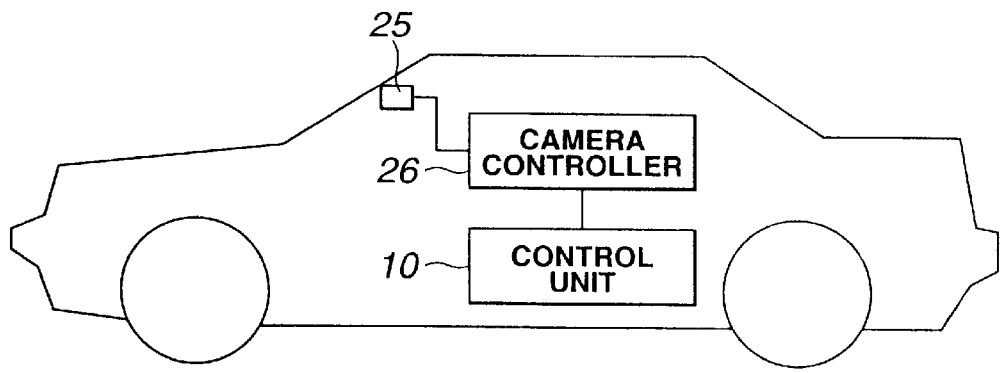
FIGS. 1A and 1B are schematic views showing a vehicle equipped with a lane following control apparatus according to a first embodiment of the present invention.
Figure 1B:
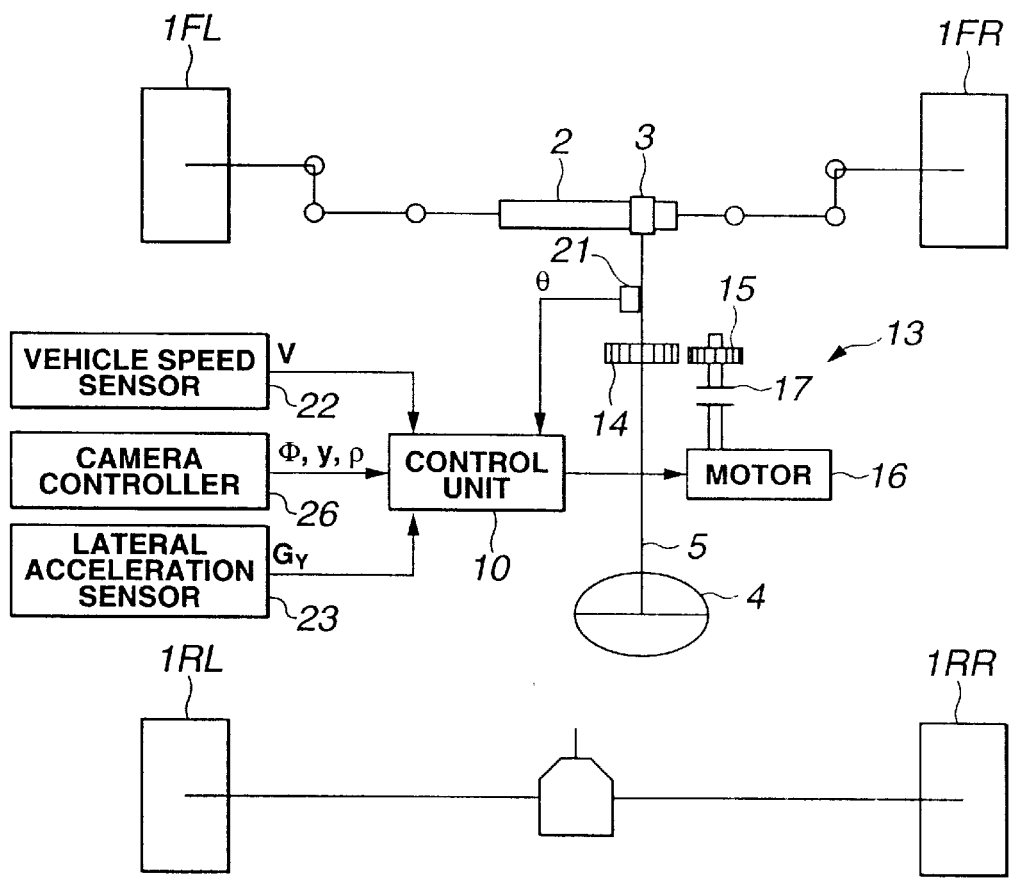

FIGS. 1A and 1B show a vehicle equipped with a lane following control apparatus or control system according to a first embodiment of the present invention.

The vehicle shown in FIGS. 1A and 1B is a controlled vehicle controlled by the lane following apparatus. The vehicle has front left and right wheels 1FL and 1FR and rear left and right wheels 1RL and 1RR, and an ordinary rack and pinion type steering mechanism for steering the front wheels. The rack and pinion steering mechanism includes a rack 2 connected with tie rods of front wheels 1FL and 1FR, a pinion 3 in engagement with rack 2, and a steering shaft 5 transmitting a steering torque inputted by the driver to a steering wheel 4, to pinion 3.

A steering actuator of this example includes an automatic steering mechanism 13, provided above pinion 3 on steering shaft 5, for automatically steering front wheels 1FL and 1FR. Automatic steering mechanism 13 includes a driven gear 14 mounted coaxially with steering shaft 14, a drive gear 15 engaging with driven gear 14, and an automatic steering motor 16 for driving drive gear 15. A clutch mechanism 17 is interposed between automatic steering motor 16 and drive gear 15. Clutch mechanism 17 is engaged only in the case of an automatic steering mode, and otherwise disengaged so that the rotation of automatic steering motor 16 cannot be inputted to steering shaft 5.

Figure 2:
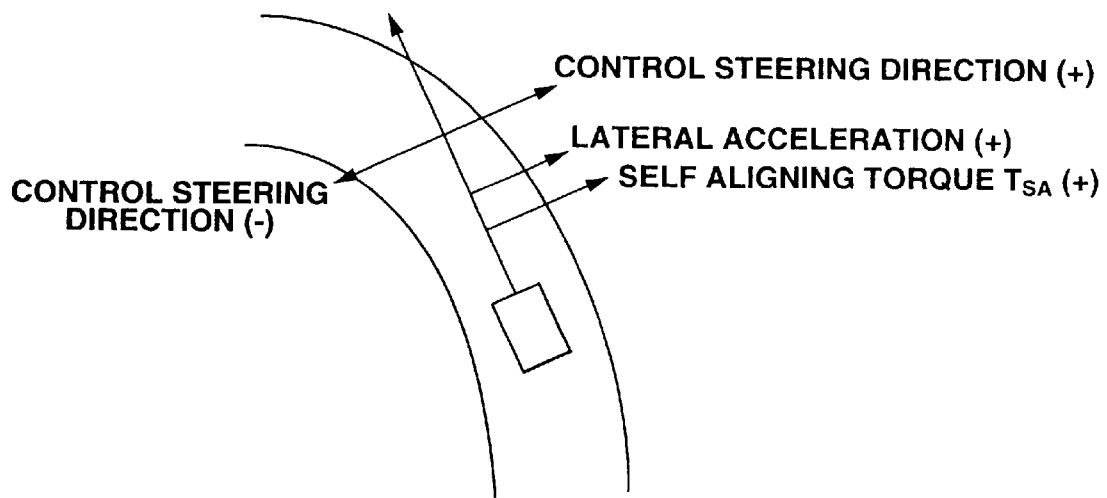
FIG. 2 is a view for illustrating a control steering direction of the control apparatus of FIGS. 1A and 1B, the direction of lateral acceleration, and the direction of self aligning torque.

Various sensors are installed in the vehicle. Steering angle sensor 21 senses an actual steering angle θ from a rotational angle of steering shaft 5, and supplies the sensed steering angle θ to control unit 10. A vehicle speed sensor 22 is provided on the output side of an automatic transmission of the vehicle, and arranged to sense a vehicle speed V of the vehicle and supply the sensed vehicle speed V to control unit 10. A lateral acceleration sensor 23 senses a lateral acceleration Gy of the vehicle, and supplies the sensed lateral acceleration Gy to control unit 10. In this example, as shown in FIG. 2, the steering angle θ outputted from steering angle sensor 21 is positive in the case of right steering operation and negative in the case of left steering operation. The lateral acceleration Gy is positive in the case of left vehicle turning operation and negative in the case of right turning operation, as shown in FIG. 2.

A camera 25 such as a CCD camera is provided to obtain a forward image of a scene ahead of the vehicle. In this example, camera 25 is a monocular camera mounted on an inner mirror stay in the passenger compartment. Picture image data obtained by the camera 25 is supplied to a camera controller 26. According to image processing method of conventional technology, camera1 controller 26 detects a white line or lane marker near the controlled vehicle by the technique of binary image, digitization or other image processing technique, and calculates a relative side deviation y of the controlled vehicle with respect to the road at a forward aim point ahead of the vehicle, a yaw angle Φ with respect to an tangent to the white line, and a road curvature ρ of the lane ahead of the controlled vehicle. The results of the calculation are outputted to control unit 10. A Published Japanese Patent Application Kokai Publication No. 11(1999)-102499 shows a binary image processing process which can be employed in this embodiment.

Control unit 10 of this example is a digital system such as a computer system including at least one microcomputer as a main component. Control unit 10 calculates a desired target steering angle θ* from the input yaw angle Φ, relative side deviation y and the road curvature ρ, to optimize a cornering operation of the vehicle. Control unit 10 further calculates a supply current or motor current iM to be supplied to automatic steering motor 16, so as to bring the sensed actual steering angle θ to the calculated target steering angle θ*. Control unit 10 performs a current limiting operation on the supply current iM, and then performs a pulse duration (or width) modulating operation for conversion to a pulse current. Thus, control unit 10 controls automatic steering motor 16 in a duty control by supplying the pulse current to automatic steering motor 16.

Figure 3:
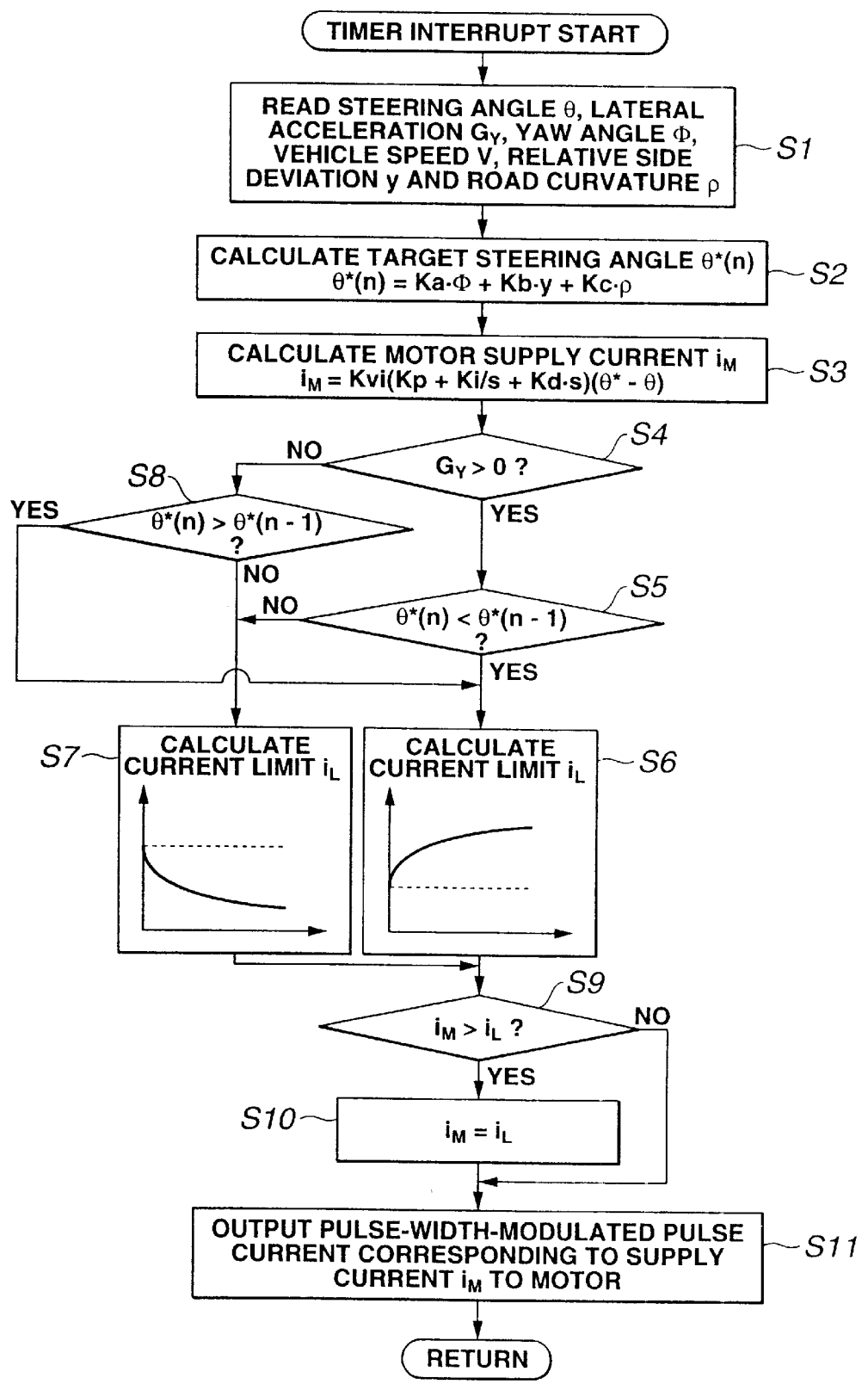
FIG. 3 is a flowchart showing a lane following vehicle control procedure according to the first embodiment.

FIG. 3 shows a control procedure which control unit 10 performs for the automatic steering control. This control procedure is executed as timer interrupt routine periodically at regular time intervals of a predetermined time, for example 10 msec.

At step S1, control unit 10 collects input information by reading the actual steering angle θ sensed by steering angle sensor 21, actual vehicle speed V sensed by vehicle speed sensor 18, actual lateral acceleration Gy sensed by lateral acceleration sensor 23. Control unit 10 further obtains yaw angle Φ, relative side deviation y and road curvature β detected by camera controller 26. Then, control unit 10 proceeds to step S2.

At step S2, control unit 10 calculates target steering angle θ*. In this example, control unit 10 determines a new value of the target steering angle θ* from the yaw angle Φ, side deviation y and curvature ρ according to the following equation.

$$\theta^* = K_a \cdot \Phi + K_b \cdot y + K_c \cdot \rho \quad (1)$$

In this equation, Ka, Kb and Kc are control gains varying in dependence on vehicle speed V. In this example, the target steering angle θ* is positive in the case of right steering operation, and negative in the case of left steering operation. Control unit 10 stores a value already stored in a memory region for a current target steering angle, in a memory region for the previous target steering angle as a previous target steering angle θ*(n−1), and instead stores the thus-calculated new value of target steering angle θ* as the current target steering angle θ*(n) in the memory region for the current target steering angle.

At next step S3, control unit 10 calculates a motor supply current iM for the automatic steering motor 16 according to the following equation (2) to perform a PID control to reduce a deviation of the actual steering angle θ from the target steering angle θ*, and stores the calculated motor supply current iM in a predetermined motor current memory region.

$$i_M = K_{vi}(K_p + K_i/s + K_d \cdot s)(\theta^* - \theta) \quad (2)$$

In this equation, Kvi is a control gain for conversion from voltage to current, Kp is a proportional gain, Ki is an integral gain and Kd is a derivative gain.

Figure 4:
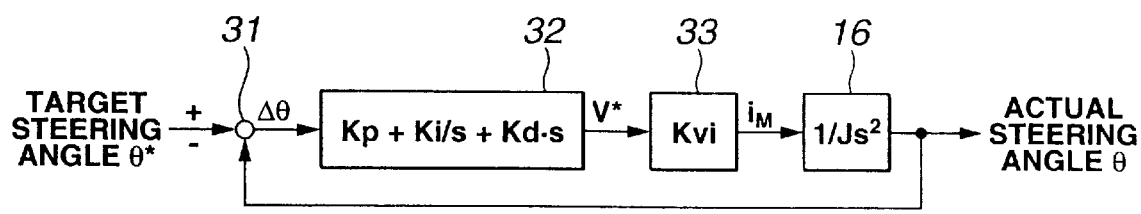
FIG. 4 is a block diagram showing a steering servo system which can be employed in the first embodiment.

This equation (2) for determining the motor supply current iM is designed to perform operations equivalent to a feedback control system shown in FIG. 4. In the feedback control system of FIG. 4, a subtracter 31 calculates a deviation Δθ by subtracting actual steering angle θ from target steering angle θ*. An operational element 32 receives deviation Δθ from subtracter 31, and calculates a target motor control voltage V* by performing a PID control computation. A voltage-to-current converter 33 receives the target motor control voltage V* from operational element 32, and calculates the motor supply current iM by multiplying the target motor control voltage V* by the control gain Kvi. The thus-calculated motor supply current iM is supplied to automatic steering motor 16. In FIG. 4, J is an inertia of a rotating portion, and Kvi is a gain of an amplifier.

After step S3, control unit 10 determines whether lateral acceleration Gy is positive or not at step S4. When Gy>0, control unit 10 judges that the vehicle is in the left turning state, and proceeds to step S5. At step S5, it is examined whether the current target steering angle θ*(n) is smaller than the previous target steering angle θ*(n−1). When θ*(n)<θ*(n−1), control unit 10 judges that the steering control is in a steer direction away from a straight ahead neutral position on the left steering side, and proceeds to step S6 to calculate a current limit iL in a first mode for the steer direction away from the neutral position. At step S6 of this example, control unit 10 calculates the current limit in accordance with the absolute value |Gy| of lateral acceleration Gy by lookup from a control map shown in FIG. 5. After step S6, control unit 10 proceeds to step S9.

Figure 6:
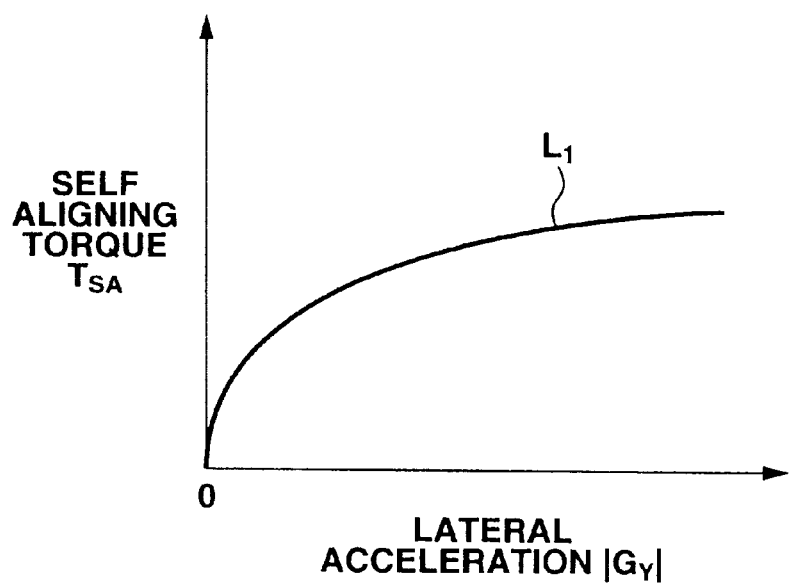
FIG. 6 is a graph showing a characteristic of a self aligning torque with respect to the lateral acceleration, used in determining the characteristic of FIG. 5.

The lateral acceleration Gy and self aligning torque TSA act in the same direction as shown in FIG. 2, and the self aligning torque TSA increases as the absolute value of lateral acceleration increases as shown in FIG. 6. In FIG. 6, self aligning torque TSA is expressed along the vertical axis, and the absolute value |Gy| of lateral acceleration is along the horizontal axis. Self aligning torque TSA is equal to zero when the absolute value of lateral acceleration is zero. When, from this state, the absolute value of lateral acceleration increases, the self aligning torque TSA increases sharply, and then, the self aligning torque TSA increases gradually with increase in the absolute value of lateral acceleration, as shown by a parabolic characteristic curve L1 in FIG. 6.

Self aligning torque TSA acts in the opposite direction to the steering torque produced by automatic steering motor 16 when the direction of lateral acceleration and the steering direction are different, that is, when a steering operation is in the steer direction away from neutral on the left steering side in the leftward vehicle turning state (on the right steering side in the rightward vehicle turning state). Therefore, in the control map of FIG. 5 for calculating the current limit, when the absolute value of lateral acceleration is zero, the current limit iL is set equal to a reference limit value iL0 for straight line driving where the self aligning torque TSA is zero. As the absolute value of lateral acceleration increases from zero, the current limit is increased sharply, and then increased gradually as shown by a characteristic curve L2 in FIG. 5.

Figure 7:
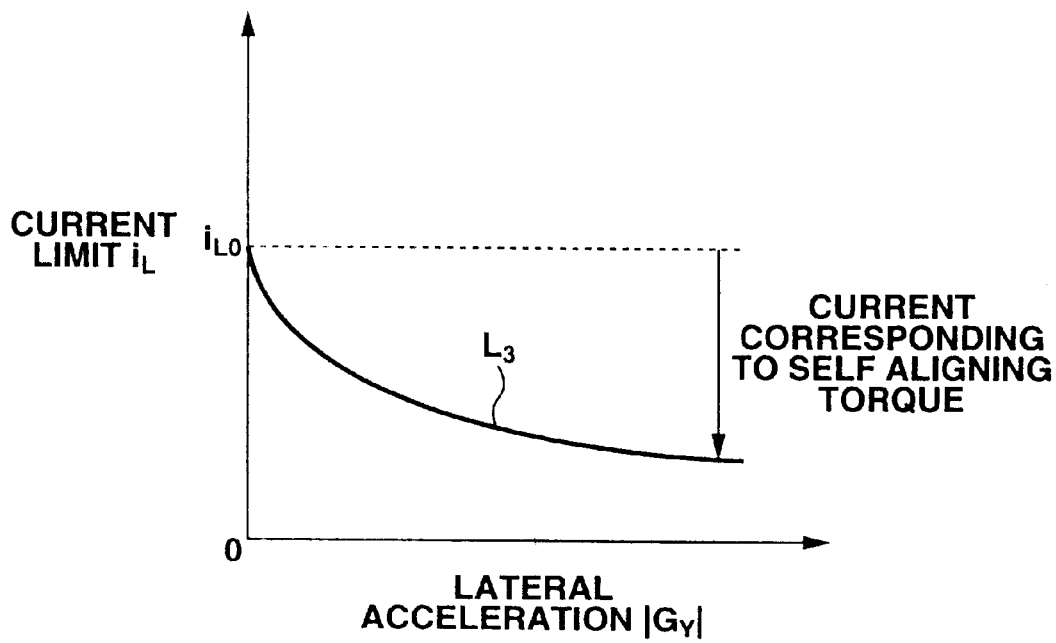
FIG. 7 is a graph showing a characteristic curve for determining the current limit (iL) in the first embodiment in the case of a return direction toward neutral.

When θ*(n)≧θ*(n−1), control unit 10 judges that the steering control is in a return direction toward the straight ahead neutral position, and proceeds from step S5 to step S7 to calculate the current limit iL in a second mode for the return direction toward neutral. At step S7 of this example, control unit 10 calculates the current limit in accordance with the absolute value of lateral acceleration Gy by lookup from a control map shown in FIG. 7. After step S7, control unit 10 proceeds to step S9.

Self aligning torque TSA acts in the same direction as the steering torque produced by automatic steering motor 16 when the steering operation is in the toward-neutral return direction on the right steering side in the leftward vehicle turning state (or on the left steering side in the rightward vehicle turning state). Therefore, in the control map of FIG. 7 for calculating the current limit in the case of the return direction toward neutral, when the absolute value of lateral acceleration is zero, the current limit iL is set equal to the reference limit value iL0. As the absolute value of lateral acceleration increases from zero, the current limit iL is decreased sharply, and then decreased gradually as shown by a characteristic curve L3 which is symmetric to the characteristic curve L2 with respect to a horizontal broken line at the reference current limit value IL0.

When Gy≦0, control unit 10 judges the turning direction to be rightward, and proceeds to step S8 to determine whether the current target steering angle θ*(n) is greater than the previous target steering angle θ*(n−1). When θ*(n)>θ*(n−1), control unit 10 judges the steering control action is in the rightward steer direction away from the neutral position, and proceeds from step S8 to step S6. When θ*(n)≦θ*(n−1), control unit 10 judges the steering control action is in the leftward return direction toward the neutral position, and proceeds from step S8 to step S7.

At step S9, control unit 10 determines whether the supply current iM calculated at step S3 is greater than the current limit iL calculated at step S6 or S7. When iM≦iL, control unit 10 proceeds directly from step S9 to step S11. When iM>iL, control unit 10 proceeds from step S9 to step S10, and sets supply current iM equal to current limit iL (iM=iL). The thus-determined supply current iM is stored as update in the motor current supply memory region, and then control unit 10 proceeds to step S11.

At step S11, control unit 10 delivers, to steering assist motor 13, pulse current obtained by pulse width modulation corresponding to the motor supply current iM stored in the motor supply current memory region, in the direction corresponding to the steering direction. Thereafter, control unit 10 terminates a current run of the timer interrupt routine, and returns to a main program.

In the example of FIG. 3, step S1 is an input section to collect input information needed for the control, steps S2 and S3 constitute a section to control an actual steering torque by setting a target steering torque, steps S4, S5 and S8 are to discriminate the steering direction, and steps S6, S7, S9 and S10 are to limit the target steering torque. Step S11 serves as an output section to produce an actual steering torque.

When the controlled vehicle is in a straight line driving state along a straight road at the middle of the road, the road curvature ρ sensed by a road curvature sensing device is equal to zero, the relative vehicle side deviation y is equal to zero because of the course of the vehicle being correctly at the middle of the road, and the yaw angle Φ is equal to zero because of the straight ahead driving state. Therefore, in the lane following control procedure of FIG. 3, the current target steering angle θ*(n) is set approximately equal to zero, and the motor supply current iM calculated at step S3 becomes equal to zero.

Since the lateral acceleration Gy sensed by lateral acceleration sensor 23 is zero, control is transferred from step S4 to S8, and then from S8 to S7 because of the previous target steering angle θ*(n−1) being also held equal to zero. The current limit iL calculated at step S7 by lookup from the control map for determining the current limit for the return direction toward neutral is set equal to the reference limit value iLO for the straight ahead driving state where the self aligning torque is zero, since the absolute value |Gy| of lateral acceleration is zero.

The motor supply current iM calculated at step S3 and stored in the predetermined memory region is zero, and smaller than the current limit value iLO. Therefore, step S11 is reached directly from step S9, and the supply of actual motor current to automatic steering motor 16 is shut off. As a result, the automatic steering torque produced by automatic steering motor 16 becomes equal to zero, and the vehicle continues running correctly along the straight road. Thus, in the straight line running state, this control system holds the automatic steering motor 16 in the non-driven state, and enables the driver to intervene in the steering operation by turning the steering wheel with light steering effort without impediment of automatic steering torque, to change lanes or to avoid forward obstacle.

When, from this straight line driving state, the controlled vehicle enters a corner curved leftward with a relatively large road curvature ρ, the camera controller 26 acts to increase the yaw angle Φ, the relative vehicle side deviation y at the forward aimed point, and the road curvature ρ in the negative direction. Therefore, the current target steering angle θ*(n) is increased in the negative direction by the procedure of FIG. 3 while the previous target steering angle θ*(n−1) remains zero, and the actual steering angle θ sensed by steering angle sensor 21 remains zero. The motor supply current iM calculated at step S3 is increased accordingly from zero in accordance with the road curvature ρ. In this state, the control system does not perform an automatic steering operation yet, so that the lateral acceleration Gy remains equal to zero. In the control procedure of FIG. 3, therefore, control unit 10 proceeds from step S4 to step S8 as in the preceding straight ahead running state, and further proceeds to step S6 since the current target steering angle θ*(n) is smaller than zero, and hence smaller than the previous target steering angle θ*(n−1). Although current limit iL is calculated at step S6 based on the control map of FIG. 5, step S6 sets the current limit iL equal to the reference limit value iLO since the absolute value of lateral acceleration remains zero.

Therefore, the motor current iM calculated at step S3 is limited to the reference limit value iLO if iM is greater than iLO, and the motor current iM at step S3 is outputted directly to automatic steering motor 16 if iM is smaller than or equal to iLO. In accordance with the motor supply current, the automatic steering motor 16 produces an automatic steering torque in the leftward steering direction, and the automatic steering mechanism 13 transmits the thus-produced automatic steering torque to steering shaft 5, and thereby steers front wheels 1FL and 1FR in the leftward direction in conformity with the sensed actual road curvature ρ.

This automatic steering operation causes the vehicle lateral acceleration Gy in the rightward direction. Lateral acceleration sensor 23 senses this lateral acceleration Gy, and supplies the sensed lateral acceleration Gy in the positive direction to control unit 10.

Therefore, step S2 in FIG. 3 provides the current target steering angle θ*(n) which is smaller than the previous target steering angle θ*(n−1) having a negative value, in accordance with the road curvature ρ, relative side deviation y and yaw angle Φ, and step S3 provides the motor supply current iM corresponding to the current target steering angle θ*(n). Then, the control system proceeds from step S4 to step S5 because of the lateral acceleration Gy being positive (Gy>0), then further proceeds to step S6 since θ*(n)<θ*(n−1) and hence the steering control operation is considered to be in the steer direction away from neutral, and calculates the current limit iL according to the control map of FIG. 5. In this case, the absolute value of lateral acceleration is greater than zero (|Gy|>0), and therefore the current limit iL is increased to a sum of the reference limit value iLO for zero self aligning torque, and a current value corresponding to a non-zero self aligning torque TSA.

The motor supply current iM calculated at step S3 to have a larger value acting against the self aligning torque TSA is supplied directly to automatic steering motor 16. Therefore, the control system can produce, with steering motor 16, the automatic steering torque of the magnitude increased in consideration of the influence of the self aligning torque TSA, and thereby provide accurate lane following vehicle control performance.

When the vehicle returns to the straight line running state after the cornering operation, the road curvature ρ decreases gradually in the state in which the lateral acceleration Gy is positive. Therefore, step S2 increases the current target steering angle θ*(n) gradually, control is transferred from step S4 to step S5, θ*(n) becomes greater than θ*(n−1), the steering control is judged to be in the return direction toward neutral, control is further transferred to step S7, and the current limit iL is calculated by using the control map of FIG. 7.

In the case of the return direction to neutral in which the direction of self aligning torque is the same as the control steering direction, the current limit iL is decreased, from the level of the reference limit value iLO for zero aligning torque, by an amount corresponding to self aligning torque TSA. By limiting the motor supply current iM with this current limit iL, the control system can produce the automatic steering toque adjusted in consideration of the self aligning torque TsA, and control the vehicle accurately along the lane.

Figure 5:
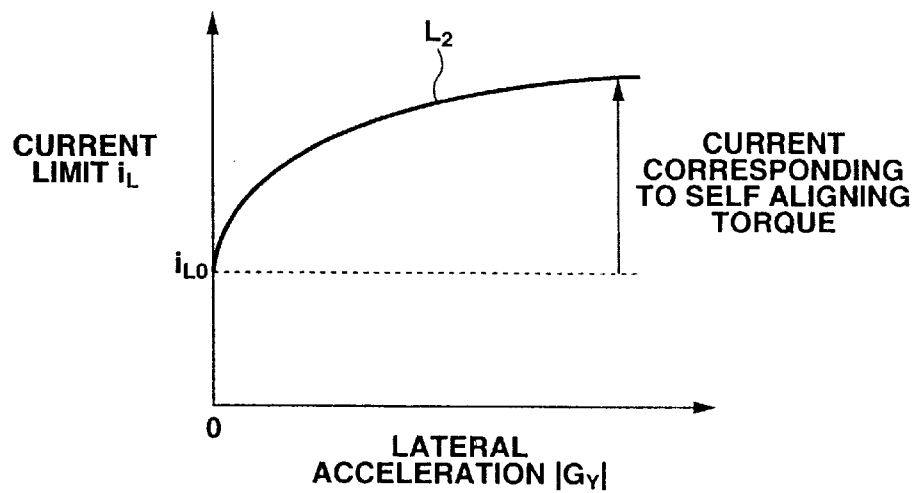
FIG. 5 is a graph showing a characteristic curve for determining a current limit ($i_L$) in the first embodiment in the case of a steer direction away from neutral.

Similarly, in the case of right cornering operation, the control system can perform accurate lane following control operations by allowing the motor supply current iM to be increased by the amount corresponding to self aligning torque TsA with the control map of FIG. 5 in the case of the away-from-neutral steer direction in which current target steering angle θ*(n) becomes greater than previous target steering torque θ*(n−1), and by restraining the motor supply current iM by the amount corresponding to self aligning toque TsA in the case of return direction toward neutral.

The direction discrimination between the steer direction away from neutral and return direction toward neutral is carried out in the example of FIG. 3 in accordance with the lateral acceleration and the target steering angle. However, it is possible to determine the steering direction by monitoring only the target steering angle. In this case, step S4 in FIG. 3 is replaced by a step to determine whether the target steering angle θ*(n) is smaller than zero (θ*(n)<0?).

FIGS. 8~14 show a lane following vehicle control apparatus according to a second embodiment of the present invention. The steering mechanism 13 is equipped with a vehicle speed responsive type power steering system, and this control apparatus is designed to steer the vehicle automatically without receiving substantial influence from the steering assist torque produced by the power steering system.

Figure 8:
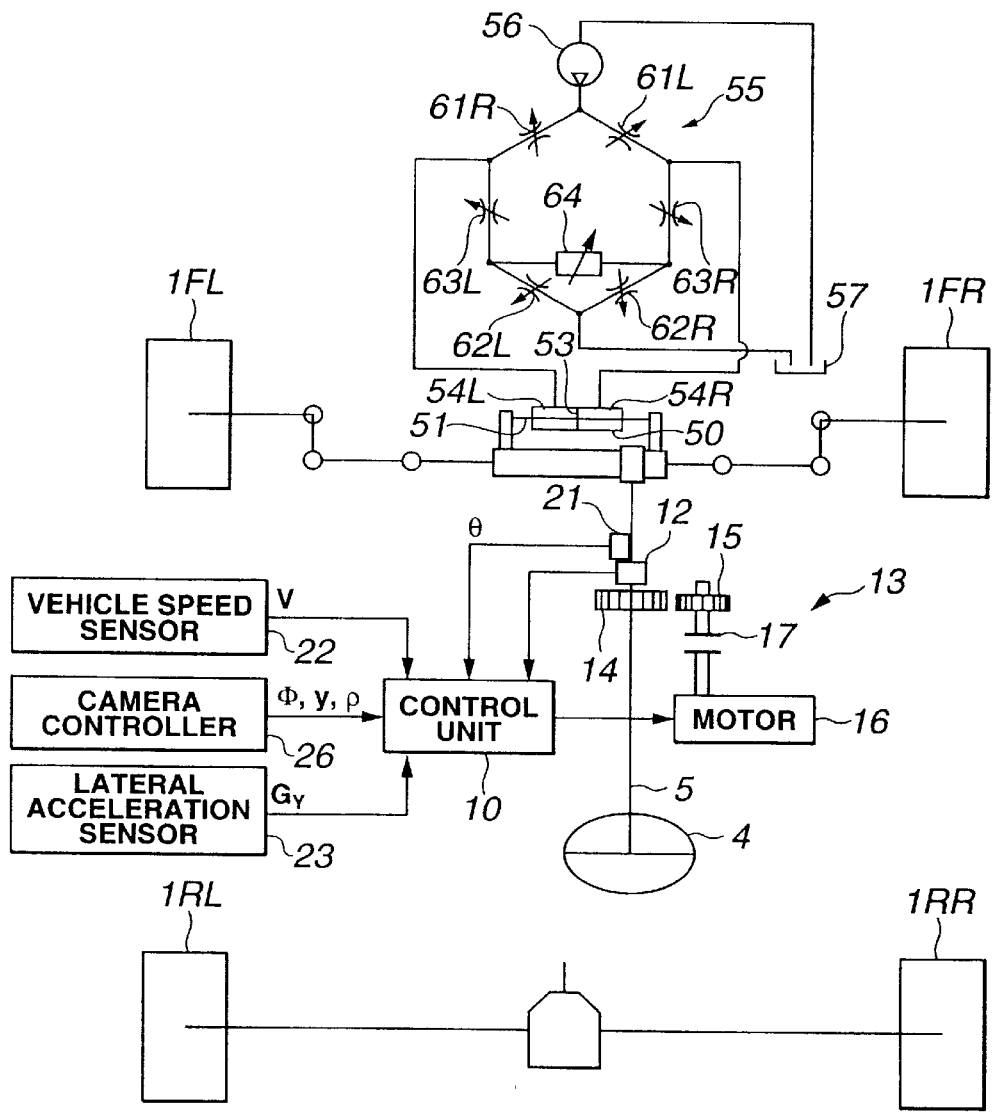
FIG. 8 is a schematic view showing a vehicle equipped with a lane following vehicle control apparatus according to a second embodiment.

As shown in FIG. 8, a power steering unit 50 is disposed in parallel to a rack 2 of the steering mechanism 13. Poser steering unit 50 includes a double rod hydraulic cylinder 51 having a piston rod 52 both ends of which are connected with rack 2. A piston 53 separates left and right fluid chambers 54L and 54R, which are connected to an oil pressure pump 56 and an oil tank 57 through a power steering valve 55.

Figure 9:
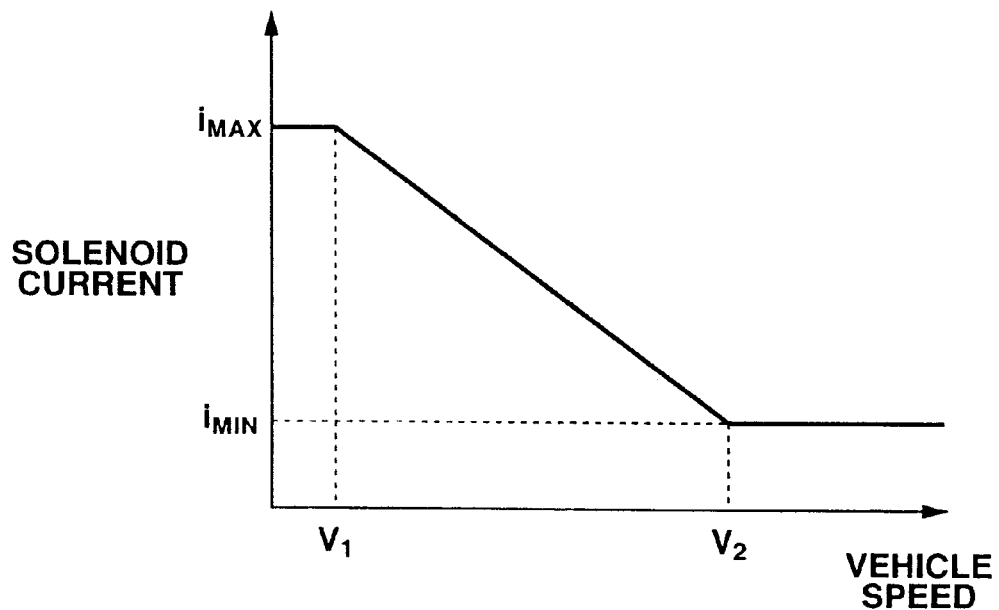
FIG. 9 is a graph showing a characteristic of solenoid current of a power steering system in the second embodiment, varying in accordance with a vehicle speed.

Power steering valve 55 is formed around a torsion bar disposed, between a driven gear 14 and a pinion 3, at a steering shaft 5. Power steering valve 55 includes variable orifices 61L, 61R, 62L, 62R, 63L and 63R, connected as shown in FIG. 8, and a solenoid valve 64 connected between a connection point between variable orifices 62L and 63L and a connection point between variable orifices 62R and 63R. When a small left (or right) steering torque is inputted to steering shaft 5, variable orifices 61L (or 61R) and 62L (or 62R) are fully closed. Orifices 63L and 63R are fully closed when a large steering torque is inputted. Solenoid valve 64 is opened as the vehicle speed V increases. The current iv supplied to solenoid valve 64 is varied in accordance with vehicle speed V as shown in FIG. 9. In a low vehicle speed region, the supply current iv is set at a high value iMAX to fully close solenoid valve 64. In a medium vehicle speed region from a first vehicle speed value V1 to a second vehicle speed value V2, the solenoid supply current iv is decreased with increase in vehicle speed V. When the vehicle speed V is higher than or equal to second vehicle speed value V2, the solenoid supply current iv is set to a minimum current value iMIN to approximately fully open the solenoid valve 64.

When the vehicle is at rest or the vehicle speed is low, solenoid valve 64 is closed, and variable orifices 61L~63R remain fully closed as long as there is no steering operation. Therefore, no fluid pressure is supplied to fluid cylinder 50, and the power steering system produces no steering assist torque. When the driver turns steering wheel 4 in a direction to steer the vehicle rightward, variable orifices 61R~63R are closed in accordance with the steering torque, and hence the fluid under pressure is conveyed from oil pressure pump 56 through variable orifices 61L, 63R and 62R to oil tank 57. Thus, the fluid pressure of an increased magnitude corresponding to the closing degree of variable orifices 62R and 63R is supplied to fluid chamber 54R to force rack 2 leftward with piston rod 51. This power steering system produces a large right steering assist torque corresponding to the supply current iv, and enables the driver to turn steering wheel lightly.

In the case of right steering operation at high vehicle speeds, solenoid valve 64 is held in the fully open state, and the working fluid bypasses variable orifice 62R, and the right fluid chamber 54R is supplied with a fluid pressure of a small magnitude produced by variable orifice 63R, to force rack 2 leftward with piston rod 51. The power steering system thus provides a light steering assist torque in accordance with solenoid current iv, and the steering effort needed from the driver is relatively heavy.

Figure 10:
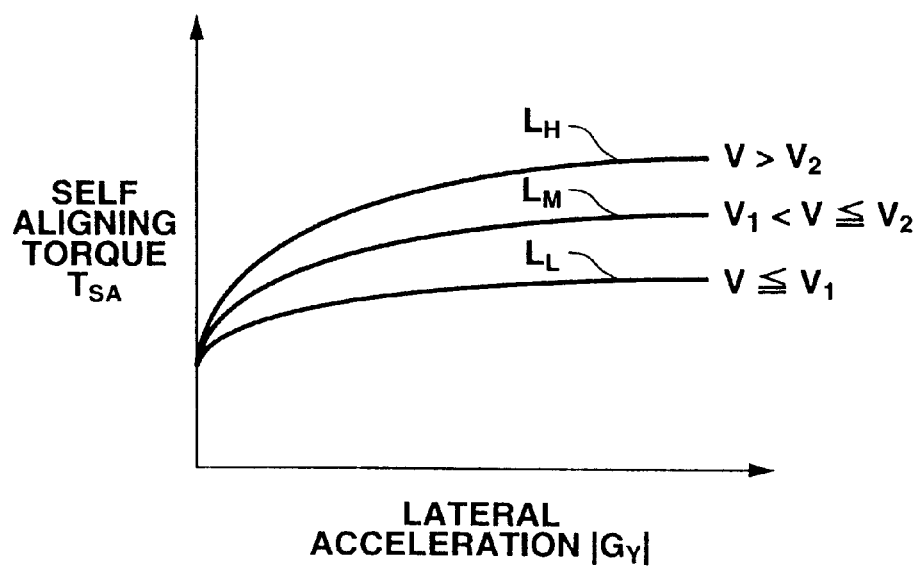
FIG. 10 is a graph showing the self aligning torque varying in accordance with the absolute value of lateral acceleration.

The steering assist torque produced by power steering unit 50 is decreased as the vehicle speed V is increased. As shown in FIG. 10 including vehicle speed V as a parameter, therefore, the self aligning torque TsA is increased with increase in the absolute value of lateral acceleration along a characteristic curve (LH, LM and LL) determined by the vehicle speed V. As the vehicle speed V decreases, the rate of increase of the self aligning torque TsA with respect to the absolute value of lateral acceleration is decreased. In the graph of FIG. 10 with the self aligning torque along the vertical axis, the characteristic curve LM for the medium vehicle speed region of V1<V≦V2 is lower than the characteristic curve LH for the high vehicle speed region of V>V2. The characteristic curve LL for the lower vehicle speed region of V≦V1 is lower than the characteristic curve LM.

Figure 11:
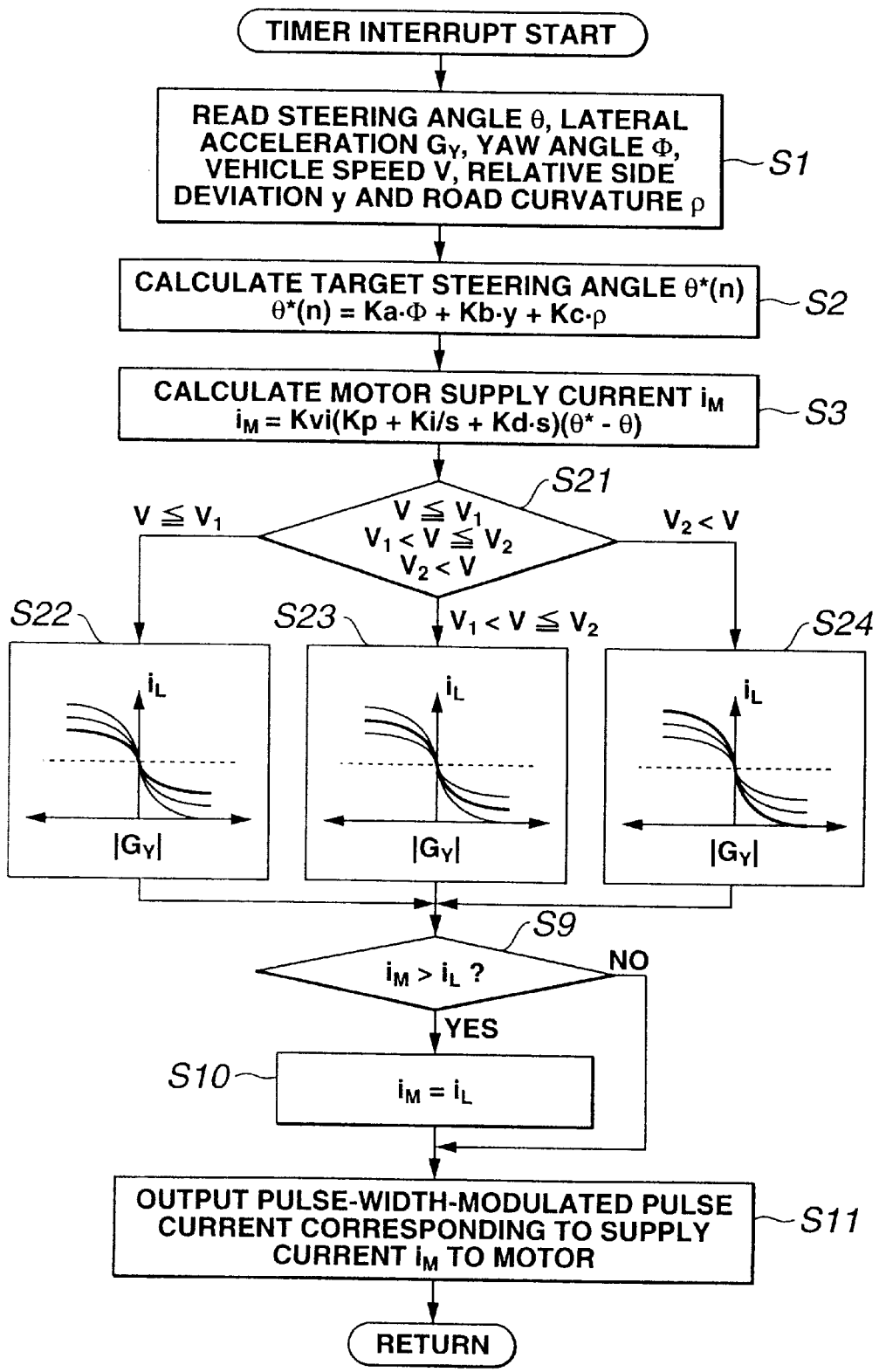
FIG. 11 is a flowchart showing a lane following vehicle control procedure according to the second embodiment.

FIG. 11 shows a steering torque limiting procedure according to the second embodiment. Step S21 follows step S3. Control unit 10 compares the actual vehicle speed V with first set value V1 and second set value V2, and discriminates among the low vehicle speed region where vehicle speed V is lower than or equal to the lower set value V1, the medium vehicle speed region where vehicle speed V is higher than V1 and lower than or equal to V2, and the high vehicle speed region where V is higher than V2.

When actual vehicle speed V is in the low vehicle speed region, control unit 10 proceeds from step S21 to step S22. By performs operations of steps S4, S5 and S8 shown in FIG. 3, at step S22, control unit 10 discriminates between the steer direction and return direction, determines the current limit iL in accordance with the absolute value of lateral acceleration Gy by using a control map shown in FIG. 12, and then proceeds to step S9. In the case of the medium vehicle speed region of V1<V≦V2, control unit 10 proceeds to step S23, discriminates between the steer direction and return direction, and determines the current limit iL in accordance with the absolute value of lateral acceleration Gy by using a control map shown in FIG. 13. Step S23 is followed by step S9. In the case of the high vehicle speed region of V>V2, control unit 10 proceeds to step S24, discriminates between the steer direction and return direction, and determines the current limit iL in accordance with the absolute value of lateral acceleration Gy by using a control map shown in FIG. 14. After step S24, control is transferred to step S9. In other respects, FIG. 11 is substantially identical to FIG. 3. Specifically, steps S1~S3, and S9~S1 in FIG. 11 are substantially identical to steps S1~S3, and S9~S11 of FIG. 3, respectively.

Figure 12:
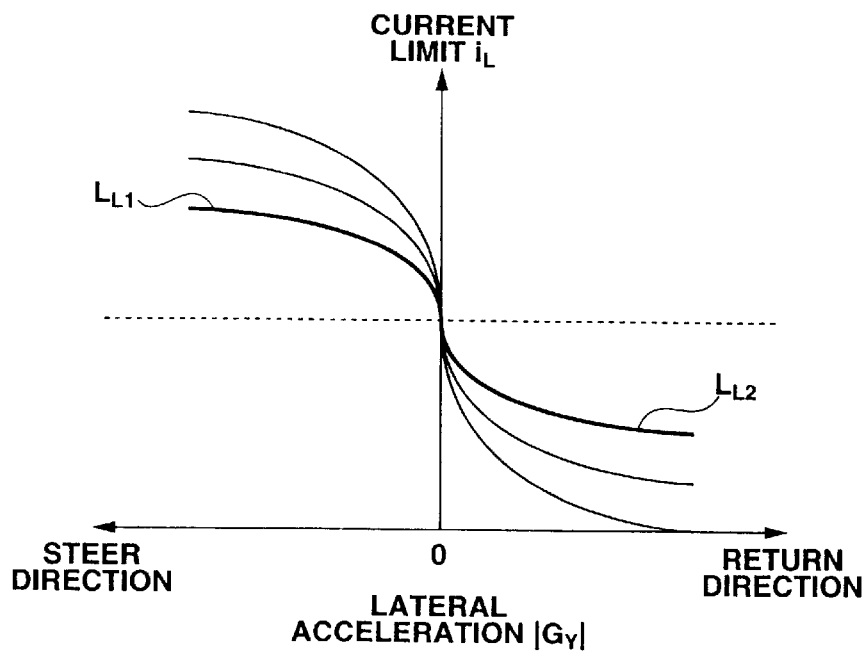
FIG. 12 is a graph showing a characteristic of a current limit with respect to the absolute value of lateral acceleration, used in a low vehicle speed region in the control procedure of FIG. 11.

The control map of FIG. 12 is designed to determine the current limit iL along a characteristic line LL1 in the second quadrant (left upper quadrant) in FIG. 12 in the case of the control steering direction being the steer direction away from neutral, and along a characteristic line LL2 in the fourth quadrant (right lower quadrant) in the case of the control steering direction being the return direction toward neutral. The characteristic line LL1 in the second quadrant corresponds to the characteristic line LL in FIG. 10. The characteristic lines LL1 and LL2 are symmetric with respect to the origin at which the absolute value of the lateral acceleration is zero, and the current limit iL is equal to the reference limit value iL. With increase in the absolute value of lateral acceleration Gy, the current limit iL is increased along the line LL1 from the reference limit value iLO in the case of the steer direction away from neutral, and decreased from the reference limit value iLO along the line LL2 in the case of the return direction toward neutral.

Figure 13:
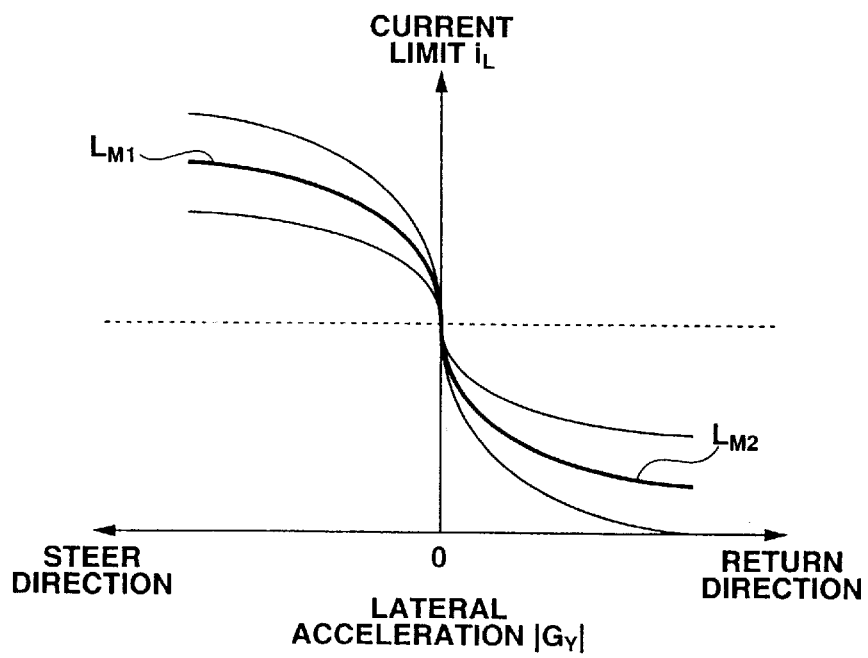
FIG. 13 is a graph showing a characteristic of a current limit with respect to the absolute value of lateral acceleration, used in a medium vehicle speed region in the control procedure of FIG. 11.

Similarly, in the control map of FIG. 13, as the absolute value of lateral acceleration Gy increases, the current limit iL is increased, from the reference value iLO, along a characteristic line LM1 in the second quadrant in the case of the control steering direction being the steer direction away from the neutral position, and decreased along a characteristic line LM2 in the fourth quadrant in the case of the control steering direction being the return direction toward the neutral position. The characteristic line LM1 in the second quadrant corresponds to the characteristic line LM in FIG. 10. The characteristic lines LM1 and LM2 are symmetric with respect to the origin at which the absolute value of the lateral acceleration is zero, and the current limit iL is equal to the reference limit value iLO.

Figure 14:
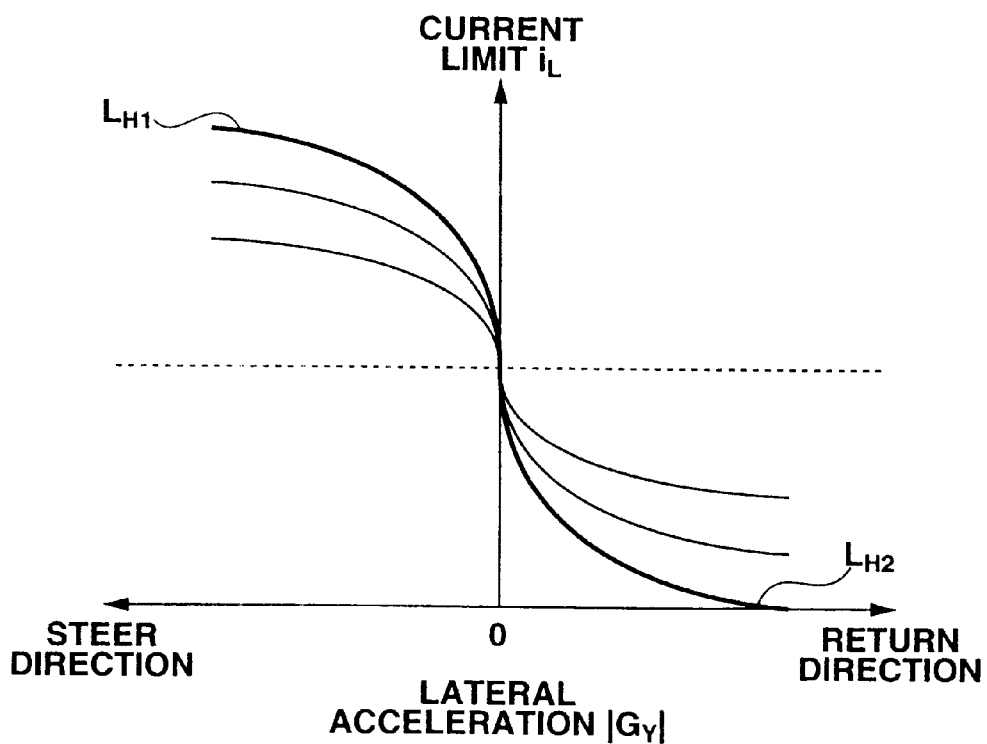
FIG. 14 is a graph showing a characteristic of a current limit with respect to the absolute value of lateral acceleration, used in a high vehicle speed region in the control procedure of FIG. 11.

Similarly, in the control map of FIG. 14, as the absolute value of lateral acceleration Gy increases, the current limit iL is increased, from the reference value iLO, along a characteristic line LH1 in the second quadrant in the case of the control steering direction being the steer direction away from neutral, and decreased along a characteristic line LH2 in the fourth quadrant in the case of the control steering direction being the return direction toward neutral. The characteristic line LH1 in the second quadrant corresponds to the characteristic line LH in FIG. 10. The characteristic lines LH1 and LH2 are symmetric with respect to the origin at which the absolute value of the lateral acceleration is zero, and the current limit iL is equal to the reference limit value iLO.

In the control procedure of FIG. 11, S21~S24 are designed to discriminate the steering direction, and to limit the target steering torque.

When vehicle speed V sensed by vehicle speed sensor 22 is in the low vehicle speed region, the control apparatus according to the second embodiment limits the motor supply current by the current limit iL calculated at step S22. When the steering control is in the steer direction away from the straight ahead neutral position, the current limit iL is calculated by using the characteristic line LL1 in such a manner that the steering assist torque increased by the vehicle speed responsive power steering system 55 is subtracted. Thus, by using the current limit determined in accordance with the lateral acceleration and vehicle speed V, the control apparatus can produce the automatic steering torque in consideration of the self aligning torque and the steering assist torque, and thereby provide accurate lane following control.

When the steering control is in the return direction toward the straight ahead neutral position, the current limit iL is calculated by using the characteristic line LL2 in such a manner that the steering assist torque increased by the vehicle speed responsive power steering system 55 is subtracted. Thus, by using the current limit determined in accordance with the lateral acceleration and vehicle speed V, the control apparatus can produce the automatic steering torque in consideration of the self aligning torque and the steering assist torque, and thereby provide accurate lane following control.

When the sensed vehicle speed V is increased into the medium or high vehicle speed region, the current limit is determined from the characteristic curve LM1 or LH1 in the case of the steer direction away from neutral, and from the characteristic curve LM2 or LH2 in the case of the return direction. Thus, by using the current limit based on the lateral acceleration and vehicle speed V, the control apparatus can produce the automatic steering torque in consideration of the self aligning torque and the power steering assist torque, and thereby provide accurate lane following control.

Figure 15:
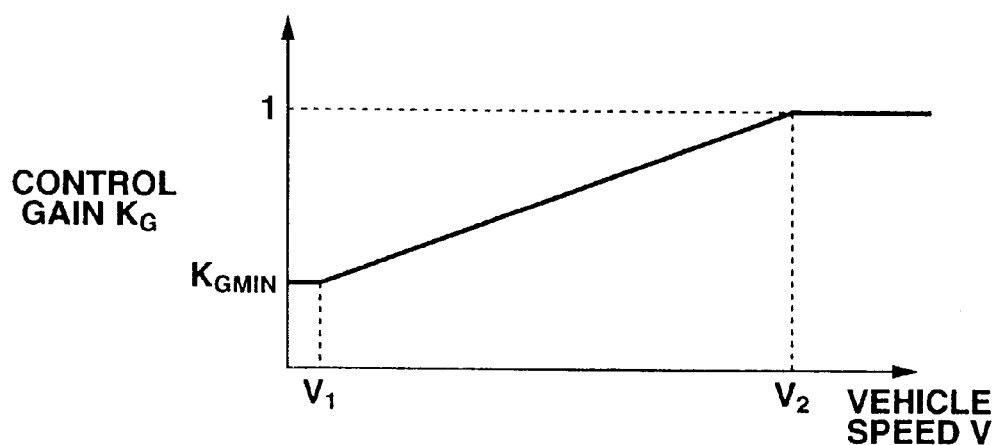
FIG. 15 is a graph showing a control gain which can be used instead of the control characteristics of FIGS. 13 and 14.

FIG. 15 shows a control gain which can be used in a variation of the second embodiment. In the example of FIG. 11, the control apparatus uses the three different control maps for the low, medium and high vehicle speed regions. However, the second embodiment is not limited to this. It is optional to determine the current limit by using a control gain varying in accordance with vehicle speed V, as shown in FIG. 15. In the example of FIG. 15, the current limit iL is first calculated by using the characteristic curves LH1 and LH2 shown in FIG. 14 for the high vehicle speed region in which the steering assist torque produced by the vehicle speed responsive power steering system is lowest. Then, a modified current limit iLA is calculated by multiplying the thus-determined current limit iL by a control gain KG determined by lookup from the control map of FIG. 15. The control apparatus of this example limits the motor supply current iM by using the modified current limit iLA. With control gain KG, the current limit can be determined adequately in conformity with changes in the steering torque of the vehicle speed responsive power steering system.

In FIG. 15, control gain KG is set equal to a minimum gain value KGMIN which is sufficiently smaller than one in a low vehicle speed region up to a first vehicle speed value V1. As vehicle speed V increases beyond first speed value V1, control gain KG increases from minimum gain value KGMIN to one. When vehicle speed V is equal to or higher than a second vehicle speed value V2, control gain KG is fixed at one.

FIGS. 16~19 shows a lane following vehicle control apparatus according to a third embodiment of the present invention. In the third embodiment, the vehicle is equipped with a vehicle speed responsive type power steering system as in the second embodiment, and the control apparatus is designed to ensure running stability during cornering operation in case of failure such as abnormality in control unit 10, breakage in wiring harness, or abnormal engagement of clutch 17.

Figure 16:
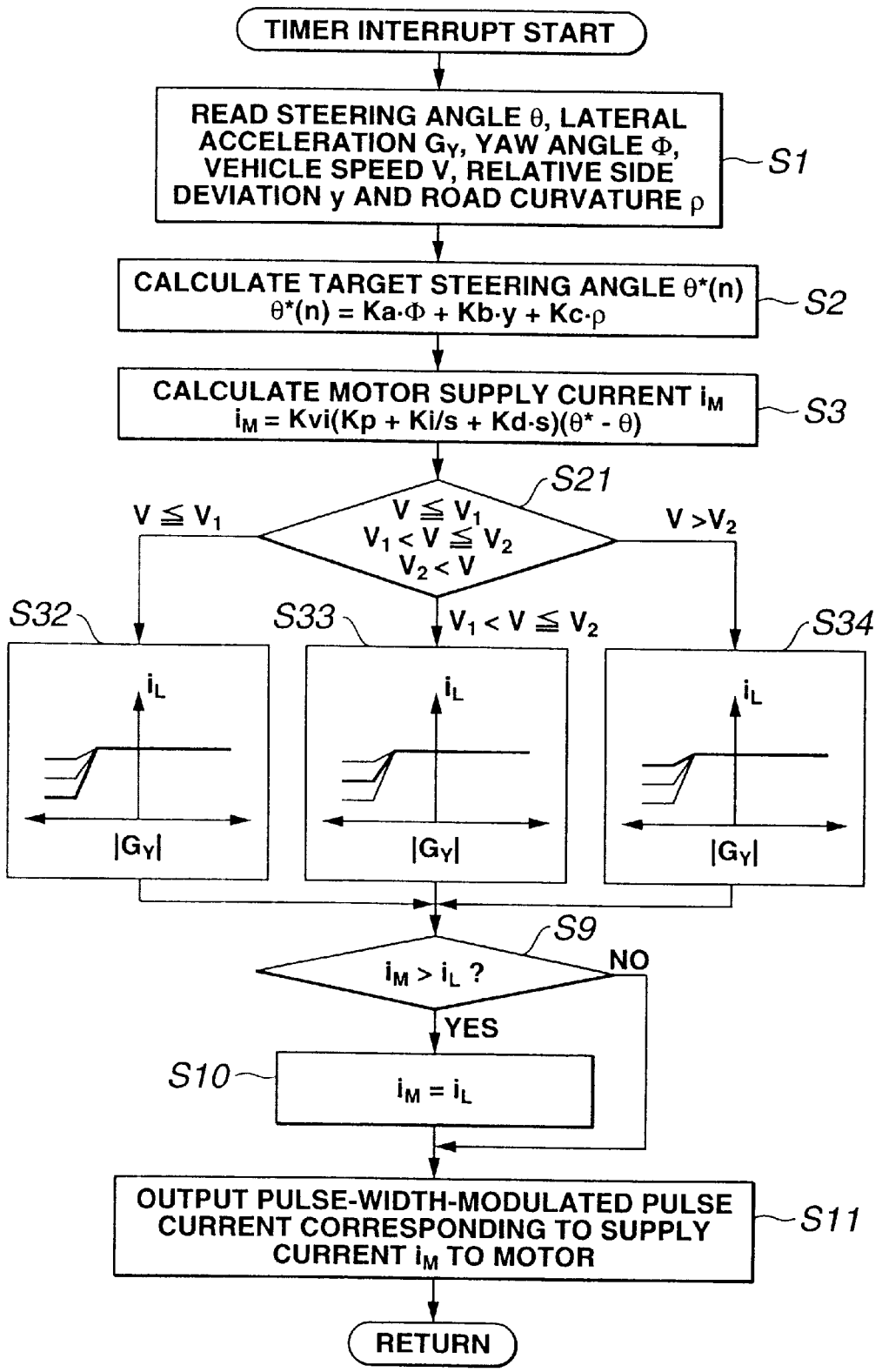
FIG. 16 is a flowchart showing a lane following vehicle control procedure according to a third embodiment.

FIG. 16 shows a control procedure according to the third embodiment. FIG. 16 is substantially identical to FIG. 11 of the second embodiment except that steps S22~S24 are replaced by steps S32~S34. Steps S1~S3, S9~S11 and S21 are substantially identical to those in FIG. 11, respectively.

When actual vehicle speed V is in the low vehicle speed region, control unit 10 proceeds from step S21 to step S32. By performs operations of steps S4, S5 and S8 shown in FIG. 3, at step S32, control unit 10 discriminates between the steer direction away from neutral and the return direction toward neutral, and determines the current limit iL in accordance with the absolute value of lateral acceleration Gy by using a control map shown in FIG. 17. In the case of the medium vehicle speed region of V1<V≦V2, control unit 10 proceeds to step S33, discriminates between the steer direction away from neutral and the return direction, and determines the current limit iL in accordance with the absolute value of lateral acceleration Gy by using a control map shown in FIG. 18. In the case of the high vehicle speed region of V>V2, control unit 10 proceeds to step S34, discriminates between the steer direction and return direction, and determines the current limit iL in accordance with the absolute value of lateral acceleration Gy by using a control map shown in FIG. 19. Step S9 is reached after steps S32, S33 or S34.

Figure 17:
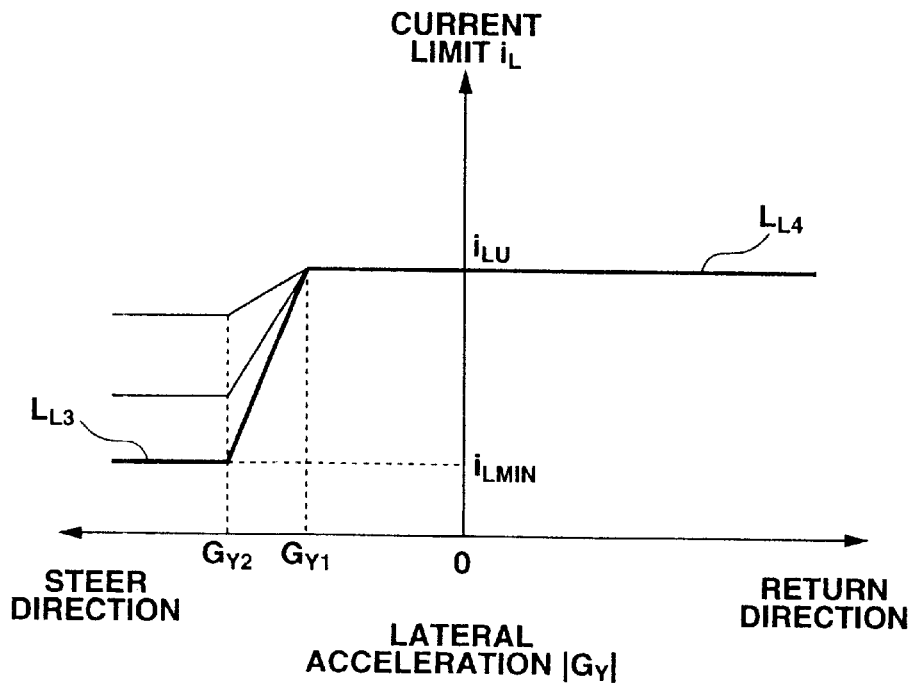
FIG. 17 is a graph showing a characteristic of a current limit with respect to the absolute value of lateral acceleration, used in the low vehicle speed region in the control procedure of FIG. 16.

In the control map of FIG. 17, control unit 10 determines the current limit iL according to a characteristic line LL3 in the second quadrant of the graph in the case of steer direction away from neutral, and according to a characteristic line LL4 in the first quadrant in the case of return direction toward neutral. In characteristic line LL3 in the second quadrant for the steer direction away from neutral, current limit iL is set invariably at a normal current limit value iLU until the absolute value |Gy| of lateral acceleration exceeds a first set value Gy1. Normal current limit value iLU is such a value as to allow the driver to turn the steering wheel and intervene in the steering operation during cornering. When the absolute value of lateral acceleration exceeds first set value Gy1, current limit iL is decreased, at a relatively high rate, with increase in the absolute value of lateral acceleration Gy. When the absolute value of lateral acceleration is greater than a second set value Gy2 greater than first set value Gy1, current limit iL is set invariably at a minimum value iLMIN. In the case of return direction toward neutral, current limit iL is held invariably at the normal current limit value iLU. Minimum current limit value iLMIN is set equal to a value resulting from subtraction of a current value corresponding to a steering assist torque produced by the vehicle speed responsive power steering system 55 in the low vehicle speed region, from a current value capable of providing such a steering torque as to enable smooth transition, at stoppage of the lane following control, from the automatic steering operation to the driver's manual steering operation.

Figure 18:
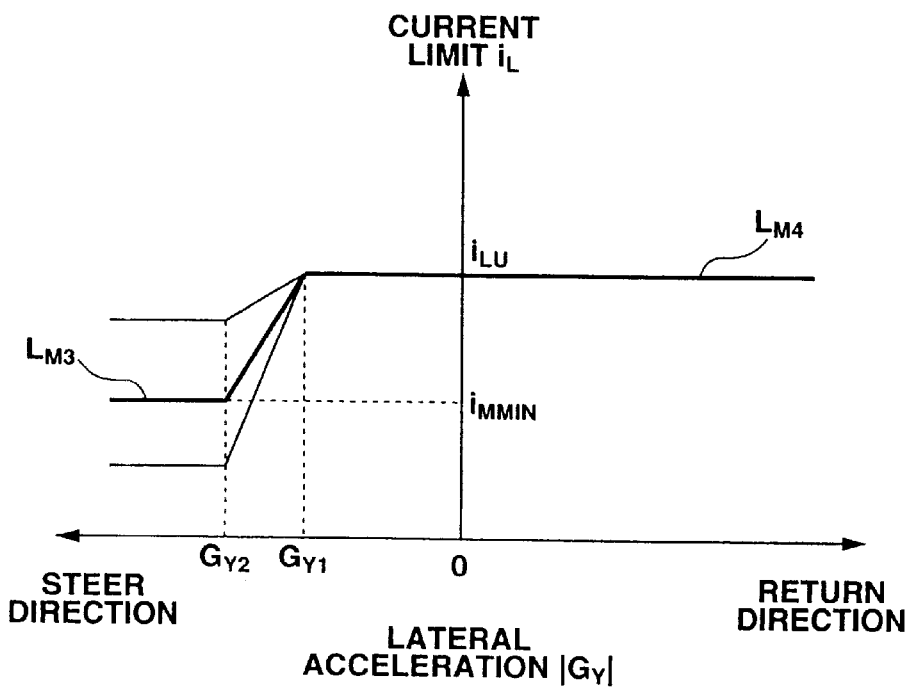
FIG. 18 is a graph showing a characteristic of the current limit with respect to the absolute value of lateral acceleration, used in a medium vehicle speed region in the control procedure of FIG. 16.

Similarly, in the control map of FIG. 18, control unit 10 determines the current limit iL according to a characteristic line LM3 in the second quadrant of the graph in the case of steer direction away from neutral, and according to a characteristic line LM4 in the first quadrant in the case of return direction toward neutral. In characteristic line LM3 in the second quadrant for the steer direction away from neutral, current limit iL is set invariably at the normal current limit value iLU until the absolute value of lateral acceleration exceeds the first set value Gy1. When the absolute value of lateral acceleration exceeds first set value Gy1, current limit iL is decreased, at a medium rate more gradual than the rate in the case of FIG. 17, with increase in the absolute value of lateral acceleration. When the absolute value of lateral acceleration is greater than the second set value Gy2, current limit iL is set invariably at a minimum value iMMIN. In the case of return direction toward neutral, current limit iL is held invariably at the normal current limit value iLU. Minimum current limit value iMMIN is set equal to a value resulting from subtraction of a current value corresponding to a steering assist torque produced by the vehicle speed responsive power steering system 55 in the medium vehicle speed region, from a current value capable of providing such a steering torque as to enable smooth transition, at stoppage of the lane following control, from the automatic steering operation to the driver's manual steering operation.

Figure 19:
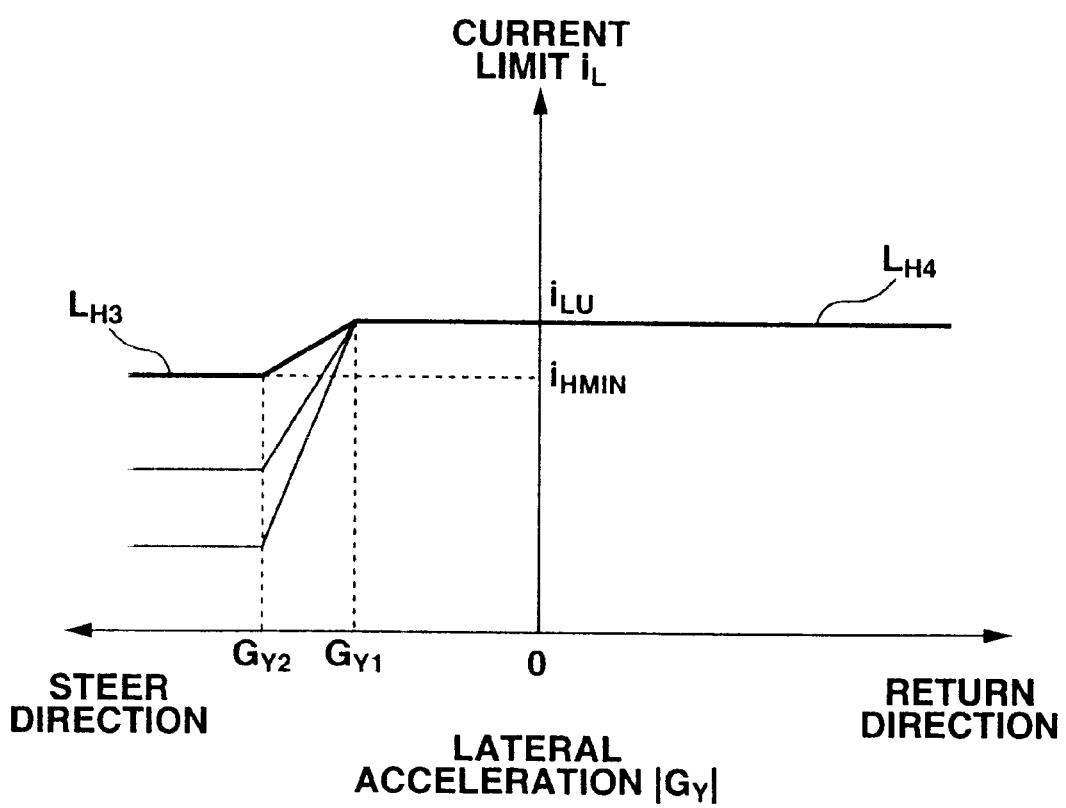
FIG. 19 is a graph showing a characteristic of the current limit with respect to the absolute value of lateral acceleration, used in a high vehicle speed region in the control procedure of FIG. 16.

Similarly, in the control map of FIG. 19, control unit 10 determines the current limit iL according to a characteristic line LH3 in the second quadrant of the graph in the case of steer direction away from neutral, and according to a characteristic line LH4 in the first quadrant in the case of return direction toward neutral. In characteristic line LH3 in the second quadrant for the steer direction away from neutral, current limit iL is set invariably at the normal current limit value iLU until the absolute value of lateral acceleration exceeds the first set value Gy1. When the absolute value of lateral acceleration exceeds first set value Gy1, current limit iL is decreased, at a gradual rate more gradual than the rate in the case of FIG. 18, with increase in the absolute value of lateral acceleration. When the absolute value of lateral acceleration is greater than the second set value Gy2, current limit iL is set invariably at a minimum value iHMIN. In the case of return direction toward neutral, current limit iL is held invariably at the normal current limit value iLU. Minimum current limit value iHMIN is set equal to a value resulting from subtraction of a current value corresponding to a steering assist torque produced by the vehicle speed responsive power steering system 55 in the high vehicle speed region, from a current value capable of providing such a steering torque as to enable smooth transition, at stoppage of the lane following control, from the automatic steering operation to the driver's manual steering operation. The minimum current limit value iHMIN is higher than iMMIN, which is in turn higher than iLMIN.

In the control procedure of FIG. 16, steps S21 and S32~S34 serve as means for discriminating the steering direction, and means for limiting the target steering torque.

When lateral acceleration Gy is produced in cornering operation at a vehicle speed in the low vehicle speed region equal to or lower than V1, and the absolute value of lateral acceleration is lower than or equal to first set value Gy1, then the current limit iL is set to normal current limit value iLU which is relatively high but capable of permitting driver's intervention. Therefore, the motor current iM corresponding to the road curvature ρ is supplied to automatic steering motor 16. Thus, the control system can control the course of the vehicle correctly along a lane by producing an automatic steering torque for automatic lane following with motor 16, in a state ready to allow steering intervention of the driver.

If the absolute value of lateral acceleration exceeds first set value Gy1, and the control steering direction is the steer direction away from neutral, current limit iL is decreased from normal value iLU, at the relatively steep rate with increase in the absolute value of lateral acceleration. Therefore, the control system functions to limit the motor current iM calculated at step S3 to current limit iL smaller than normal value iLU, and thereby restrains the automatic steering torque in the steer direction away from neutral in consideration of a large steering assist torque produced by power steering system 55.

If motor supply current iM for steering motor 16 is decreased abruptly to zero by failure such as abnormality in control unit 10, breakage in harness, of if transmission of automatic steering torque to steering shaft 5 is interrupted by an abnormal condition to bring clutch 17 from an engaged state to a disengaged state, then the control system effectively restrains the automatic steering torque produced by motor 16 by limiting the motor supply current iM in the steer direction away from neutral. Therefore, the steering wheel is rotated by a restoring torque resulting from subtraction of a friction torque in the steering system, from self aligning torque TSA, so that the deviation between the automatic steering torque during the lane following vehicle control and the restoring torque is decreased. The control system can thus prevent abrupt restoration to the straight ahead state, facilitate driver's intervening steering operation and secure the vehicle running stability.

If the absolute value of lateral acceleration exceeds second set value Gy2 due to an increase in the road curvature ρ or an increase in vehicle speed V, current limit iL is set to minimum value iLMIN, to limit the automatic steering toque to the lowest limit level. Thus, the control system can prevent abrupt change in steering torque in case of an abnormal condition, maintain the state allowing the driver to perform intervening steering operation readily, and secure the running stability.

In the case of the return direction in which the current target steering angle θ*(n) is smaller than the previous target steering angle θ*(n-1), current limit iL is held at the normal limit value iLU to raise the limit since the self aligning torque TSA acts in the same direction as the steering toque produced by automatic steering motor 16, so as to return front wheels 1FL and 1FR toward the straight ahead position even if the automatic steering torque is abruptly reduced in an abnormal condition.

When vehicle speed V is in the medium or high speed region, and the automatic steering operation is in the steer direction away from neutral, the steering assist torque produced by vehicle speed responsive power steering system 55 decreases, and accordingly the current limit iL is decreased more gradually in the lateral acceleration region between Gy1 and Gy2 along line LM3 of FIG. 18 or line LH3 of FIG. 19. Thus, the control system raises the limit of the automatic steering torque as compared with the limit for the low vehicle speed region. The control system decreases the deviation between the automatic steering torque during the lane following vehicle control and the restoring torque as in the low vehicle speed region, facilitates driver's intervening steering operation and secures the vehicle running stability.

In the third embodiment, too, it is possible to employ the control gain as shown in FIG. 15. In this case, the control system can calculate the current limit iL accurately adapted to the steering assist torque of power steering system 55, by determining the control gain by lookup from the control gain map of FIG. 15, and multiplying normal current limit value iLU by the control gain.

In the second and third embodiments, the power steering system 50 is of a hydraulic type. However, these embodiments are not limited to the hydraulic type. The vehicle speed responsive power steering system may be an electric power steering system utilizing an electric motor.

In the illustrated embodiments, the target steering angle θ* for lane following is calculated in accordance with yaw angle Φ, relative side deviation y and road curvature ρ. It is, however, possible to determine the target steering angle in various other ways. The target steering angle may be calculated from the relative side deviation y and the road curvature ρ; or from vehicle speed V and road curvature ρ according to the following equation (3).

$$\theta^* = (a+b) \cdot \rho + (m \cdot \rho \cdot V^2 (b \cdot Cr - a \cdot Cf))/((a+b) Cf \cdot Cr) \quad (3)$$

In this equation, a is a distance between the front wheel axle and the vehicle's center of gravity in a plan view, b is a distance between the rear wheel axle and the center of gravity in the plan view, m is the mass of the vehicle, Cf is a cornering stiffness for the left and right front wheels, and Cr is a cornering stiffness for the left and right rear wheels. Moreover, to determine the target steering angle θ*, the road curvature ρ may be calculated by determining a current vehicle location by location determining technology such as GPS, and determining the road curvature ahead of the vehicle from map information of a navigation system.

This application is based on a prior Japanese Patent Application No. 2000-205488. The entire contents of this Japanese Patent Application No. 2000-205488 with a filing date of Jul. 6, 2000 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A lane following vehicle control apparatus for a vehicle, comprising:

a lane sensing section to collect information on a lane of a road ahead of the vehicle;

a steering angle sensing section to sense an actual steering angle of the vehicle;

a steering torque producing section to produce an actual steering torque in accordance with a target steering torque to follow the lane;

a steering torque controlling section to set the target steering torque required for the vehicle to follow the lane, in accordance with the information on the lane and the actual steering angle;

a control steering direction discriminating section to determine whether a control steering direction of the steering torque controlling section is a steer direction away from a straight ahead neutral position or a return direction toward the straight ahead neutral position; and a target steering torque limiting section to limit the target steering torque by setting a target torque limit in dependence on whether the control steering direction is the steer direction or the return direction.

2. The lane following vehicle control apparatus as claimed in claim 1, wherein the control apparatus further comprises a cornering motion sensing section to determine a lateral acceleration of the vehicle, and the target steering torque limiting section sets the target torque limit in accordance with the lateral acceleration and the control steering direction.

3. The lane following vehicle control apparatus as claimed in claim 2, wherein the target limiting section increases the target torque limit as the absolute value of the lateral acceleration increases when the control steering direction of the steering torque controlling section is the steer direction away from the neutral position.

4. The lane following vehicle control apparatus as claimed in claim 2, wherein the target limiting section decreases the target torque limit as the absolute value of the lateral acceleration increases when the control steering direction of the steering torque controlling section is the return direction toward the neutral position.

5. The lane following vehicle control apparatus as claimed in claim 1, wherein the target steering torque limiting section makes the target torque limit higher in the case of the steer direction away from the neutral position than in the case of the return direction toward the neutral position.

6. The lane following vehicle control apparatus as claimed in claim 1, wherein the control steering direction discriminating section judges the control steering direction to be the steer direction away from the neutral position when the control steering direction of the steering controlling section is different from the direction of the lateral acceleration of the vehicle, and judges the control steering direction to be the return direction toward the neutral position when the control steering direction and the direction of the lateral acceleration are the same one of leftward and rightward directions.

7. The lane following vehicle control apparatus as claimed in claim 1, wherein the steering torque controlling section determines the target steering torque in accordance with a target steering control quantity, and the control steering direction discriminating section judges the control steering direction to be the steer direction away from the neutral position when the target steering control quantity is increasing on a positive side, or when the target steering control quantity is decreasing on a negative side, and judges the control steering direction to be the return direction toward the neutral position when the target steering control quantity is decreasing on the positive side or when the target steering control quantity is decreasing on the negative side.

8. The lane following vehicle control apparatus as claimed in claim 2, wherein, when the control steering direction is the steer direction away from the neutral position, the target steering torque limiting section decreases the target torque limit as the absolute value of the lateral acceleration increases in a lateral acceleration region in which the absolute value of the lateral acceleration is greater than or equal to a first level.

9. The lane following vehicle control apparatus as claimed in claim 8, wherein, when the steering control direction is the steer direction away from the neutral position and the absolute value of the lateral acceleration is greater than or equal to a second level greater than the first level, the target steering torque limiting section sets the target torque limit at a torque level to allow a driver's manual steering operation in case of stoppage of a steering control by the steering torque producing section.

10. The lane following vehicle control apparatus as claimed in claim 1, wherein the control apparatus further comprises a vehicle speed sensing section to sense a vehicle speed of the controlled vehicle, and the target limiting section decreases the target torque limit as the vehicle speed decreases.

11. The lane following vehicle control apparatus as claimed in claim 1, wherein the steering torque producing section comprises an electric motor to produce the actual steering torque in response to a supply current, and the target steering torque limiting section limits the supply current for the electric motor by setting the target torque limit as an upper limit of the supply current.

12. A lane following vehicle control process comprising:
collecting input information on a vehicle running condition of a vehicle running along a lane, and an actual steering angle of the vehicle;
producing a control signal to produce an actual steering torque in accordance with a target steering torque to follow the lane;
setting the target steering torque to achieve a target steering angle determined in accordance with the vehicle running condition and the actual steering angle to follow the lane;
determining whether a control steering direction of the target steering angle is a steer direction away from a straight ahead neutral position or a return direction toward the straight ahead neutral position; and
limiting the target steering torque by setting a target torque limit in dependence on whether the control steering direction is the steer direction or the return direction.

13. A lane following vehicle control apparatus comprising:
means for collecting input information on a vehicle running condition of a vehicle in relation to a lane;
means for sensing an actual steering angle of the vehicle;
means for producing an actual steering torque in accordance with a target steering torque to follow the lane;
means for determining a target steering angle in accordance with the vehicle running condition and the actual steering angle to follow the lane;
means for setting the target steering torque to achieve the target steering angle;
means for determining a control steering direction by examining changes in the target steering angle; and
means for limiting the target steering torque by setting a target torque limit in dependence on whether the control steering direction is a steer direction away from a straight ahead neutral position or a return direction toward the straight ahead neutral position.

14. The lane following vehicle control apparatus as claimed in claim 13, wherein the control apparatus further comprises means for sensing a cornering vehicle motion variable of the vehicle; and the limiting means sets the target torque limit in accordance with the cornering motion variable in a first mode in the case of the steer direction and in a second mode different from the first mode in the case of the return direction.

* * * * *